United States Patent [19]
Miller

[11] 3,941,013
[45] Mar. 2, 1976

[54] COMPOUND EPICYCLIC TRANSMISSION SYSTEMS

[75] Inventor: Albert Arthur Miller, Esher, England

[73] Assignee: Wilson Miller & Co., Ltd., Middlesex, England

[22] Filed: Aug. 14, 1974

[21] Appl. No.: 497,220

[30] Foreign Application Priority Data
Aug. 17, 1973 United Kingdom............... 38957/73

[52] U.S. Cl. ................................................. 74/740
[51] Int. Cl.² ........................................ F16H 37/00
[58] Field of Search.................... 74/740, 785, 764

[56] References Cited
UNITED STATES PATENTS

| | | |
|---|---|---|
| 3,096,666 | 7/1963 | Christenson et al. ............. 74/740 X |
| 3,264,902 | 8/1966 | Breting et al. .................... 74/740 X |
| 3,452,621 | 7/1969 | Golan et al. ....................... 74/752 C |
| 3,618,424 | 11/1971 | Golan et al. ....................... 74/740 X |
| 3,815,445 | 6/1974 | Gorrell et al. .......................... 74/740 |

*Primary Examiner*—Leonard H. Gerin
*Attorney, Agent, or Firm*—Woodhams, Blanchard and Flynn

[57] ABSTRACT

A vehicle transmission comprises an epicyclic change-speed unit in series with a supplementary two-speed unit having a direct drive ratio and an indirect overdrive or reduction ratio, thereby doubling the number of ratios provided by the change-speed unit. A further ratio is provided by a compound connection between the change-speed and supplementary units.

15 Claims, 7 Drawing Figures

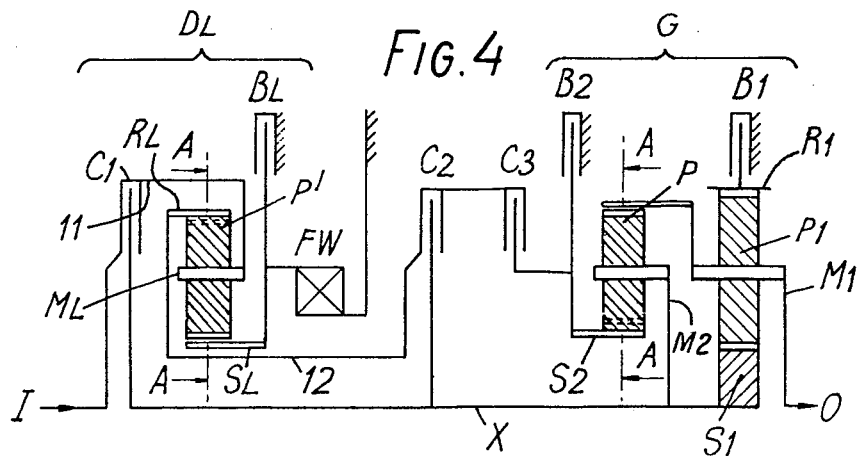
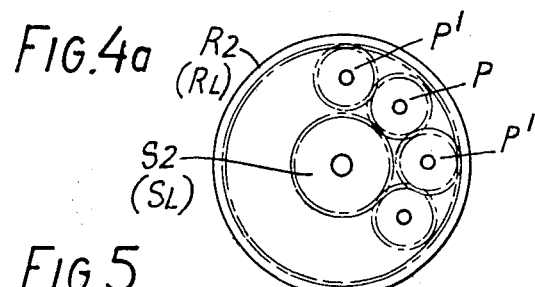
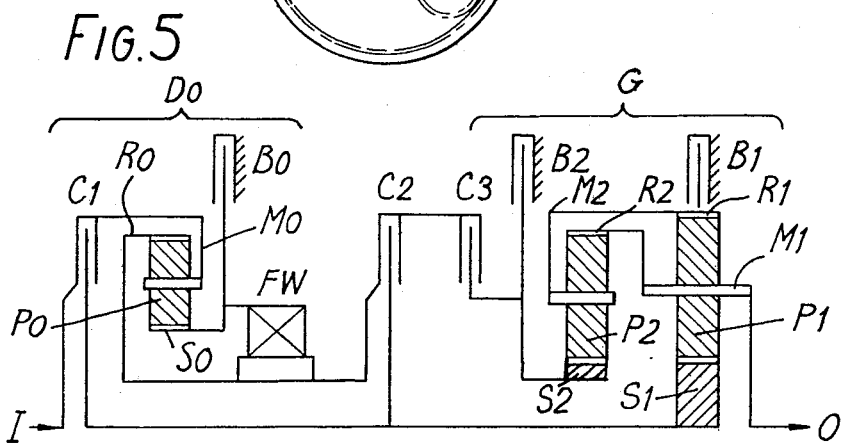
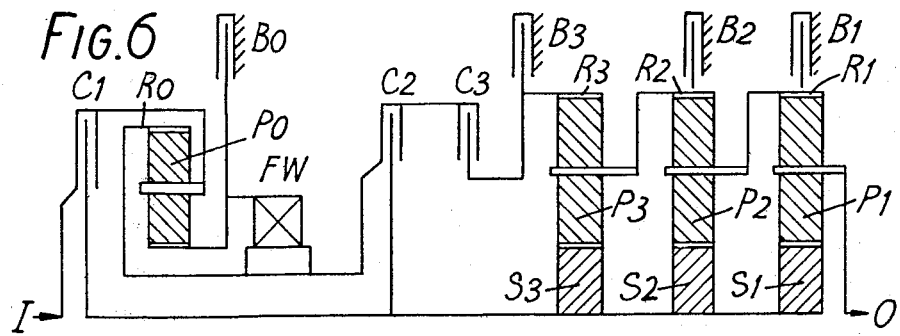

COMPOUND EPICYCLIC TRANSMISSION SYSTEMS

This invention relates to vehicle transmissions of the type in which an epicyclic change-speed gear unit is constructed to provide two or more reduction ratios between its input member and its output member by the application of braking means selectively to arrest the rotation of one or another of its reaction members and in which there is interposed in the drive-line between the prime mover and the said input member a supplementary two-speed unit which provides, in addition to a direct-drive or unit ratio, an indirect ratio which may be either an overdrive or an underdrive ratio; that is to say, the input member of the change-speed unit may selectively be driven either at the same speed as the prime mover or at a speed which is higher or lower than that of the prime mover, depending on whether the supplementary unit is constructed to operate as an overdrive or as an underdrive unit in its indirect ratio.

In transmissions of this type it is usual to design the units to provide ratios of such values that the selective combination of ratios effective simultaneously in the supplementary unit and in the changespeed unit provides a progressive series of overall transmission ratios in which the incremental step between successive ratios is equal to or substantially equal to the incremental step between the two ratios provided in the supplementary unit. In some examples of this type of transmission, however, the individual ratios are chosen so as to provide in combination a series of overall transmission ratios which progress in increments which correspond to the square root of the incremental ratio between the two ratios provided in the supplementary unit.

In a vehicle transmission of the type hereinbefore described in which one of the overall ratios is unity, i.e. direct drive, it is desirable that the ratio next above unity (if an overdrive ratio is provided) or the ratio immediately below unit (if no overdrive ratio is provided) should be closer to unity than the other ratios in the series are close to their successive ratios. This postulates the provision of an overall transmission ratio which is numerically smaller than the indirect ratio in the supplementary unit and preferably smaller than the square root of that ratio.

It is an object of the present invention to provide in a transmission of the type hereinbefore described an additional overall ratio intermediate between unit value and the value of the indirect ratio in the supplementary unit.

It is a further object of the invention to provide in the said transmission an overall ratio which has a numerical value less than the square root of the numerical value of the indirect ratio in the supplementary unit.

According to the invention, means are provided for selectively establishing a driving connection to one of the reaction members of the change-speed unit from the output of the supplementary two-speed unit operating in its indirect ratio, while at the same time establishing a driving connection between the input member of the change-speed gearing and the input member of the supplementary two-speed unit.

Thus if the supplementary unit is operating as an overdrive unit the chosen reaction member of the change-speed unit will be driven at a speed greater than that of the prime mover in the ratio of the indirect drive provided in the supplementary unit and if the latter unit is operating as an underdrive or reduction unit the said reaction member will be driven at a speed lower than that of the prime mover in the ratio of the indirect drive provided in the supplementary unit. In this way the change-speed unit, or part of it, acts as a differential gear delivering at its output a speed intermediate between that of the prime mover and that delivered from the output member of the supplementary two-speed unit operating in its indirect ratio.

Embodiments of the invention will now be described by way of example with reference to the accompanying diagrammatic drawings, in which:

FIG. 4 shows another transmission in longitudinal section,

FIG. 4A is a cross-section on either of the lines A-A of FIG. 4, and

FIGS. 5 and 6 show two further transmissions in longitudinal section.

In the different Figures of the drawings, corresponding parts are indicated by the same reference numerals.

Figure 1:
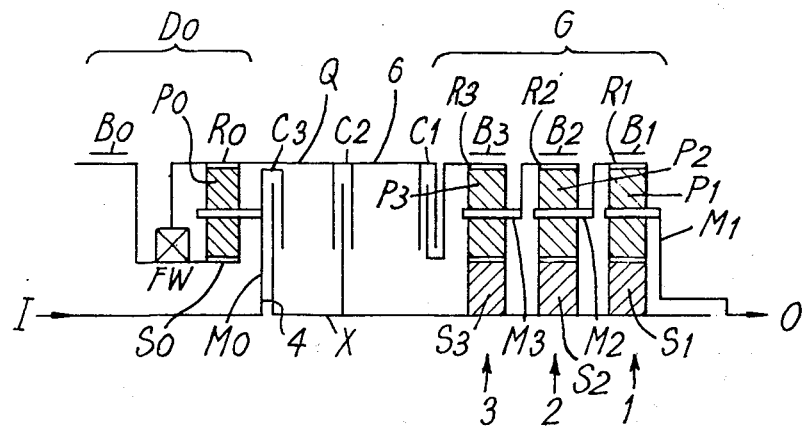
FIG. 1 shows one transmission in longitudinal section.

The transmission shown in FIG. 1 includes a change-speed unit G comprising first, second and third epicyclic gear trains 1, 2 and 3 respectively each having a 22-tooth sun pinion S, a 68-tooth internal ring gear R and a set of 23-tooth planet pinions P each meshing with both the sun pinion S and the ring gear R and mounted on bearings in a planet carrier M, the carrier $M_1$ of the first train being secured to the output member O of the change-speed unit G, while a shaft X on which the three sun pinions $S_1$, $S_2$, $S_3$ are secured is the input member of the change-speed unit G. The ring gear $R_1$ of the first train is secured to and rotates with the planet carrier $M_2$ of the second train 2, whose ring gear $R_2$ is secured to and rotates with the planet carrier $M_3$ of the third train. Braking means $B_1$, $B_2$, $B_3$ are provided for selectively arresting the rotation of each of the ring gears $R_1$, $R_2$, $R_3$ of the three trains, to establish speed reduction ratios of 4.09 : 1, 2.33 : 1 and 1.757 : 1 respectively between the input and output members X and O.

The transmission also includes a supplementary epicyclic two-speed overdrive unit $D_o$ comprising a 22-tooth sun pinion $S_o$, a 68-tooth internal ring gear $R_o$ and a set of 23-tooth planet pinions $P_o$ each meshing with both the sun pinion $S_o$ and the ring gear $R_o$ and mounted on bearings in a planet carrier $M_o$. This supplementary unit $D_o$ is mounted coaxially with the change-speed unit G and at the end adjacent to the third train 3. Interposed between the two units are first, second and third friction clutches $C_1$, $C_2$, $C_3$ which are independently and selectively operable by the application of fluid pressure to their operating pistons. The first clutch $C_1$ is nearest to the change-speed unit G and its driven member is connected to the ring gear $R_3$ of the third train. The second clutch $C_2$ may be situated either within the first clutch $C_1$ or intermediately between the first and third clutches $C_1$ and $C_3$ and its driven member is connected to the input shaft X of the change-speed unit, as is also the driven member of the third clutch $C_3$ whose driving member is attached to the input member I of the supplementary unit. The driving members of the first and second clutches are connected to the output member Q of the supplementary unit $D_o$.

The supplementary unit $D_o$ is constructed to provide between its input and output members I and Q selectively a direct drive and an indirect drive ratio which in the transmission shown in FIG. 1 is overdrive ratio. As can be seen in FIG. 1, planet carrier $M_o$ of the supplementary unit is secured to the input member I and its ring gear $R_o$ is secured to its output member Q. In the modification shown in FIG. 2, the ring gear $R_u$ of the supplementary unit $D_u$ is secured to its input member I and its planet carrier $M_u$ is secured to its output member Q. This gives an indirect reduction ratio. In either case, the sun pinion $S_o$ or $S_u$ is provided with braking means $B_o$ or $B_u$ which, when applied, causes the supplementary unit $D_o$ or $D_u$ to operate in its indirect ratio. The sun pinion $S_o$ or $S_u$ is also connected to one member of a one-way clutch or free-wheel unit FW which, in the case of the overdrive unit $D_o$, (FIG. 1) prevents the sun pinion $S_o$ from overrunning the planet carrier $M_o$ or the ring gear $R_0$ and which, in the case of the reduction unit $D_u$, (FIG. 2) prevents the sun pinion $S_u$ from rotating backwards, i.e. oppositely to the rotation of its input member I.

The input shaft I of the supplementary unit $D_o$ or $D_u$ is also the input member of the combined transmission and is coaxial with the input and output members X and O of the change-speed unit. The said input shaft I preferably extends through a hole in the centre of the sun pinion $S_o$ or $S_u$ of the supplementary unit and is connected to the input member of the supplementary unit $D_o$ or $D_u$ by the flange 4 which extends radially outward between it and the third clutch $C_3$, whose driving member it is integral with or connected to. The sun pinion $S_o$ or $S_u$ of the supplementary unit is an annular member surrounding the input shaft I and it is extended axially in the direction remote from the change-speed unit G to engage with a flanged member 5 which extends radially outward to form one element of the braking means $B_o$ or $B_u$ therefor.

The connection between the output member Q of the supplementary unit $D_o$ or $D_u$ and the driving members of the first and second clutches $C_1$ and $C_2$ is in the form of a sleeve 6 which, in the case of the overdrive unit ($D_o$, FIG. 1), may be integral with the ring gear $R_o$ and passes outwardly of the third cluth $C_3$. In the case of the reduction unit ($D_u$, FIG. 1) it is connected to a radial extension 7 of the planet carrier on the side remote from the clutches and extends outwardly of the ring gear $R_u$ and of the third clutch $C_3$.

When the clutches are all disengaged there is no drive transmitted from the prime mover to the change-speed unit. When the third clutch $C_3$ is engaged a direct drive is transmitted thereto. When the second clutch $C_2$ only is engaged and the sun pinion $S_o$ or $S_u$ of the supplementary unit is arrested by its brake $B_o$ (FIG. 1), or by its free-wheel F in the case of the reduction unit $D_u$ (FIG. 2), then the drive from the prime mover will be transmitted to the change-speed unit G at the indirect ratio. When the first and second clutches $C_1$ and $C_2$ are engaged simultaneously the change-speed unit G rotates en bloc to give an overall transmission ratio equal to that effective in the supplementary unit $D_o$ or $D_u$ at the time. When the first and the third clutches $C_1$ and $C_3$ alone are engaged and the supplementary unit $D_o$ or $D_u$ is operating in its indirect ratio, an overall transmission ratio is provided whose numerical value is closer to unity than the said indirect ratio and is less than the square root thereof.

A transmission constructed according to the foregoing example can be shown to provide a progressive series of eight overall ratios set out in Table I.

TABLE 1

Figure 2:
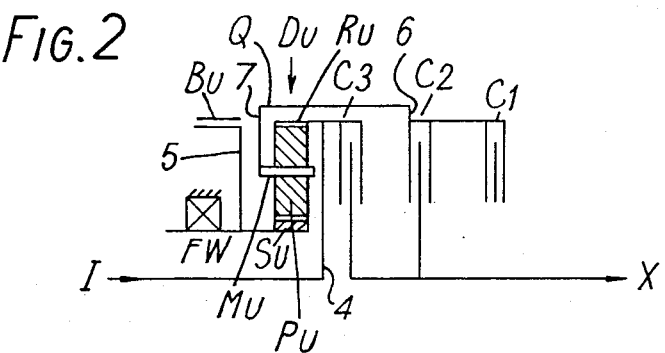
FIG. 2 shows a modification of a portion of FIG. 1.

| | Figure 2 | | | | Figure 1 | |
|---|---|---|---|---|---|---|
| Speed | Elements Engaged | Overall Ratio | Step | Step | Overall Ratio | Elements Engaged |
| 1st | $B_u\ B_1\ C_2 =$ | 5.4 | | | 4.09 | $C_2\ C_3\ B_1$ |
| | | | 1.324 | 1.324 | | |
| 2nd | $C_3\ B_1\ C_2 =$ | 4.09 | | | 3.09 | $C_2\ B_0\ B_1$ |
| | | | 1.324 | 1.324 | | |
| 3rd | $B_u\ B_2\ C_2 =$ | 3.09 | | | 2.33 | $C_2\ C_3\ B_2$ |
| | | | 1.324 | 1.326 | | |
| 4th | $C_3\ B_2\ C_2 =$ | 2.33 | | | 1.757 | $C_2\ C_3\ B_3$ |
| | | | 1.326 | 1.324 | | |
| 5th | $C_3\ B_3\ C_2 =$ | 1.757 | | | 1.326 | $C_2\ B_0\ B_3$ |
| | | | 1.326 | 1.326 | | |
| 6th | $B_u\ C_1\ C_2 =$ | 1.324 | | | 1.00 | $C_1 C_2\ C_3$ |
| | | | 1.18 | 1.14 | | |
| 7th | $B_u\ C_1\ C_3 =$ | 1.12 | | | 0.878 | $C_1\ B_0\ C_3$ |
| | | | 1.12 | 1.16 | | |
| 8th | $C_1\ C_2\ C_3 =$ | 1.00 | | | 0.756 | $C_1\ B_0\ C_2$ |

Thus, in each case, the increments or steps between successive ratios from the first to the sixth ratio are substantially equal to the indirect ratio of the supplementary unit, namely, 1.324 : 1. It will be seen that when the latter unit is an overdrive type (FIG. 1) the sixth speed ratio is unity and that the increment from this ratio to seventh ratio is 1.14 : 1, which is less than the square root of 1.324. The eighth ratio is a further increment of 1.16 from seventh. When the supplementary unit is the reduction type (FIG. 2) the eighth ratio is unity and the seventh ratio is 1,12 : 1. The sixth ratio is 1.324 : 1, so the increment from sixth to seventh ratio is approximately 1.18 and the final increment to eighth ratio is 1.12, which is less than the square root of 1.324.

The transmissions shown in FIGS. 1 and 2 may be modified in that the tooth numbers are varied to provide a main series of overall ratios which progress in increments substantially equal to the square root of the indirect ratio of the supplementary unit. In this case the latter unit has a ring gear, sun and planets of 76, 32 and 22 teeth respectively; the first and second trains of the change-speed unit each have ring gears, sun pinions and planets 67, 29 and 19 teeth respectively and the third train has corresponding members of 67, 17 and 25 teeth respectively. This arrangement can be shown to provide a progressive series of nine overall ratios, in which the increment between first and second is equal to the indirect ratio of the supplementary unit, namely, 1.42 : 1, and succeeding increments to sixth ratio are each approximately 1.19, which is substantially the square root of 1.42. The increment from sixth to seventh ratio of 1.15. If the supplementary unit is overdrive type the seventh ratio is unity and the eighth ratio is 1.16 higher i.e. an increment less than the square root of the indirect ratio of 1.42. The final increment to ninth ratio is 1.22. If the supplementary unit is the reduction type the ninth ratio is unity and the eighth is 1.13 lower, while the increment from seventh to eighth is approximately 1.25.

In order to achieve a suitable progression of overall ratios in any transmission of the type herein described it is necessary that the ratios provided in the change-speed unit shall progress in increments which bear a defined relationship to the increment between the two ratios of the supplementary unit. If the latter increment be designated X' it will be observed that, in the first example described herein, the ratios of the changespeed unit progressed according to the following pattern:
  Increment from 1st to 2nd ratio = $X^2$
  Increment from 2nd to 3rd ratio = $X$
  Increment from 3rd to unity = $X^2$ In the modification described in the previous paragraph, the corresponding pattern was as follows:
  Increment from 1st to 2nd ratio = $X^{1.5}$
  Increment from 2nd to 3rd ratio = $X^{0.5}$
  Increment from 3rd to unity = $X^{1.5}$ (approx.)

In a further modification illustrated in FIG. 3 the corresponding pattern is as follows:
  Increment from 1st to 2nd ratio = $X^2$
  Increment from 2nd to 3rd ratio = $X^2$
  Increment from 3rd to unity = $X^2$ In FIG. 3 the arrangement of the transmissison is similar to that of FIGS. 1 or 2 except that the third epicyclic gear train 3 of the change-speed unit G is differently interconnected with the other members of that unit and with the first clutch. Thus the ring gear $R_3$ of the third train 3 is secured to the planet carrier $M_2$ of the second train and the planet carrier $M_3$ of the third train is secured to the ring gear $R_2$ of the second train by a sleeve 9 which surrounds the ring gear $R_3$ of the third train. The sun pinion $S_3$ of the third train, instead of the ring gear $R_3$, is connected to the driven member of the first clutch $C_1$ and is free from the shaft X which passes through its centre and to which the first and second sun pinions $S_1$ and $S_2$ are secured. Braking means $B_3$ applied in the foregoing examples to the ring gear of the third train is now instead applied to arrest the sun pinion $S_3$ when it is required to establish the 3rd speed ratio in the change-speed unit G. The tooth numbers in the ring gear, sun pinion and planets, respectively are, in the first train 67, 23 and 22; in the second train 72, 18 and 27 and, in the third train, 68, 22 and 23. The corresponding tooth numbers in the train of the supplementary unit are 81, 21 and 30. This makes the indirect ratio in the supplementary unit 1.26 and the reduction ratios in the change-speed unit are 3.91, 2.47 and 1.58. It can be shown that this transmission provides a progressive series of nine overall ratios in which the increments between successive ratios from first to seventh are each substantially equal to 1.26. When the supplementary unit is the overdrive type the seventh ratio is unity and the eighth ratio is higher by an increment of 1.1 while the ninth ratio is higher by a further increment of 1.15. When the supplementary unit is the reduction type the seventh ratio is 1.26 and the eighth is 1.08 while the ninth is unity. Thus the increment from seventh to eighth is 1.16 and the final increment from eighth to ninth ratio is 1.08.

In the transmission shown in FIG. 4, the change-speed unit G comprises only two epicyclic gear trains 1 and 2. The first gear train 1 has its planet carrier $M_1$ connected to the output shaft while its sun gear $S_1$ is secured to the shaft X and braking means $B_1$ are provided for its ring gear $R_1$. The planet carrier $M_1$ is also secured to the ring gear $R_2$ of the second train. The latter has intermeshing pinions P and P' (FIG. 4a), the pinions P meshing with the sun gear $S_2$ while the pinions P' mesh with the ring gear $R_2$. The planet carrier $M_2$, which carries both the pinions P and the pinions P' is secured to the shaft X. The driven member of the clutch $C_3$ and the brake $B_2$ are connected to the sun gear $S_2$. The driven members of the clutches $C_1$ and $C_2$ are secured to the shaft X. The input I is secured to the driving element of the clutch $C_1$, and to the planet carrier $M_L$ of the supplementary reduction gear train $D_L$ which comprises a single epicyclic gear train which is of the same construction as the second gear train 2 of the changespeed unit G. In each of these two trains, the ring gear has 72 teeth, each of the planet gears P and P' has 19 teeth and the sun gear has 28 teeth. In the first gear train, the ring gear $R_1$ has 80 teeth, the pinions $P_1$ each have 27 teeth and the sun gear $S_1$ has 25 teeth.

The input I is secured by means of a sleeve 11 to the planet carrier $M_L$. The ring gear $R_L$ is connected by a further sleeve 12 passing within the sun gear $S_L$ and its free wheel FW to the driving portions of the clutches $C_2$ and $C_3$. Table II shows the ratios obtained.

TABLE II

| Speed | Elements Engaged | | | Ratio | Step |
|---|---|---|---|---|---|
| 1st | $B_L$ | $C_2$ | $B_1$ | 6.87 | |
| | | | | | 1.636 |
| 2nd | $C_1$ | | $B_1$ | 4.2 | |
| | | | | | 1.57 |
| 3rd | $B_L$ | $C_2$ | $B_2$ | 2.68 | |
| | | | | | 1.636 |
| 4th | $C_1$ | | $B_L$ | 1.636 | |
| | | | | | 1.386 |
| 5th | $C_1$ | $C_3$ | $B_L$ | 1.18 | |
| | | | | | 1.18 |
| 6th | $C_1$ | $C_2$ | $C_3$ | 1.0 | |
| Reverse | $B_L$ | $C_3$ | $B_1$ | 6.6 | |

The transmission shown in FIG. 1 differs from that shown in FIG. 4 in that the second gear train 2 of the change-speed unit G and the gear train of the supplementary overdrive unit $D_0$ are both of the simple epicyclic type in which the planet pinions each mesh both with the sun gear and with the annulus. Moreover, the free wheel FW interconnects the sun wheel $S_0$ and the driving element of the clutch $C_2$ and provides a direct drive through the supplementary unit $D_0$ under conditions of positive torque by preventing the sun gear $S_0$ from over-running its ring gear $R_0$. It assists gear-shifting in the forward ratios. The clutch $C_1$ provides reaction for negative braking torque.

The ring gears $R_1$, $R_2$, $R_0$ have respectively 80, 72 and 72 teeth. The planets $P_1$, $R_2$, $P_0$ have respectively 27, 24 and 17 teeth. The sun gears $S_1$, $S_2$ and $S_0$ have respectively 25, 24 and 38 teeth. The ratios obtained are set out in Table III.

TABLE III

| Speed | Elements Engaged | | | Ratio | Step |
|---|---|---|---|---|---|
| 1st | $C_1$ | | $B_1$ | 4.2 | |
| | | | | | 1.527 |
| 2nd | $B_0$ | $C_2$ | $B_1$ | 2.75 | |
| | | | | | 1.527 |
| 3rd | $C_1$ | | $B_2$ | 1.8 | |
| | | | | | 1.527 |
| 4th | $B_0$ | $C_2$ | $B_2$ | 1.18 | |
| | | | | | 1.18 |
| 5th | $C_1$ | $C_2$ | $C_3$ | 1.0 | |
| | | | | | 1.235 |
| 6th | $C_1$ | $C_3$ | $B_0$ | 0.81 | |
| | | | | | 1.235 |
| 7th | $B_0$ | $C_2$ | $C_3$ | 0.655 | |
| Reverse | (FW) | $C_3$ | $B_1$ | 3.0 | |

The embodiment shown in FIG. 6 differs from that shown in FIG. 5 in that the change-speed unit is replaced by a change-speed unit similar to the unit G shown in FIG. 1.

Each of the ring gears $R_1$, $R_2$ and $R_3$ in the FIG. 6 construction has 80 teeth, each of the pinions $P_1$, $P_2$ and $P_3$ has 27 teeth and each of the sun gears $S_1$, $S_2$ and $S_3$ has 25 teeth. The ratios obtained are set out in Table IV. The ring gear $R_o$ has 72 teeth, the sun gear $S_o$ has 28 teeth and the planet gears $P_o$ have 22 teeth.

In the embodiments shown in FIGS. 4 to 6, Reverse is obtained as shown in the tables.

TABLE IV

| Speed | Elements Engaged | | | Ratio | Step |
|---|---|---|---|---|---|
| 1st | $C_1$ | | $B_1$ | 4.2 | |
| | | | | | 1.389 |
| 2nd | $B_o$ | $C_2$ | $B_1$ | 3.03 | |
| | | | | | 1.27 |
| 3rd | $C_1$ | | $B_2$ | 2.38 | |
| | | | | | 1.33 |
| 4th | $C_1$ | | $B_3$ | 1.79 | |
| | | | | | 1.389 |
| 5th | $B_o$ | $C_2$ | $B_3$ | 1.29 | |
| | | | | | 1.29 |
| 6th | $C_1$ | $C_2$ | $C_3$ | 1.0 | |
| | | | | | 1.172 |
| 7th | $C_1$ | $C_3$ | $B_o$ | 0.854 | |
| | | | | | 1.185 |
| 8th | $B_o$ | $C_2$ | $C_3$ | 0.72 | |
| Reverse | (FW) | $C_3$ | $B_1$ | 3.03 | |

Figure 3:
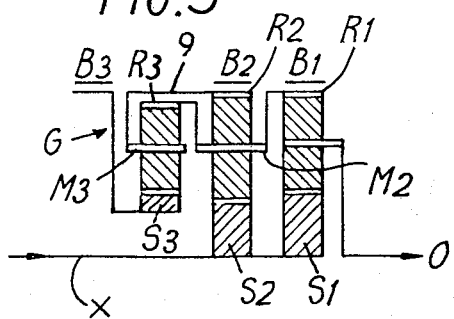
FIG. 3 shows a modification of another portion of FIG. 1.

In the embodiments of FIGS. 1 to 3, a reverse drive is obtainable when the first clutch is engaged and the second and third clutches are disengaged and the braking means is applied to hold the ring gear of the first train against rotation.

It will be understood that the improvements effected by the application of the invention to transmission systems having gearing constructed as described herein are equally valid when the invention is applied to systems employing other forms of epicyclic or planetary gearing. It is also to be understood that any such transmission system may be further extended by the use of an additional change-speed unit connected in series with it in the drive-line in order to supplement the range and number of overall transmission ratios obtainable from such combination.

I claim:
1. A vehicle transmission comprising an epicyclic change-speed gear unit constructed to provide at least two reduction ratios between its input member and its output member by the application of braking means selectively to arrest the rotation of one or another of its reaction members, and a supplementary two-speed unit constructed to provide selectively a direct drive or unitary ratio and an indirect ratio differing from unity, the two units being connected so that the overall ratio is the product of the selected ratios of the two units, wherein connecting means are provided for selectively establishing (1) a first driving connection to one of the said reaction members of the change-speed unit from the output member of the supplementary two-speed unit operating in its indirect ratio and (2) a second driving connection between the input member of the change-speed gear unit and the input member of the supplementary two-speed unit.

2. A transmission according to claim 1, wherein the indirect ratio of the supplementary unit is a reduction ratio.

3. A transmission according to claim 1, wherein the supplementary unit is epicyclic.

4. A transmission according to claim 3, wherein the two units are in line and coaxial and the supplementary unit is upstream of the changespeed unit.

5. A transmission according to claim 4, wherein the transmission input shaft extends through the sun gear of a supplementary unit.

6. A transmission according to claim 4, wherein the output member of the supplementary unit extends through a sun gear of the supplementary unit.

7. A transmission according to claim 1, wherein the change-speed unit has three gear trains, a planet carrier of the first train being the output member of the change-speed unit, a ring gear of the first train being secured to a planet carrier of the second train, a ring gear of the second train being secured to a planet carrier of the third train, a ring gear of the third train forming the said one reaction member, and sun gears of the first, second and third trains being secured to the input member of the change-speed unit.

8. A transmission according to claim 1, wherein the change-speed unit has two gear trains, a ring gear of the first train being secured to a planet carrier of the second gear train, a ring gear of the second gear train being secured to a planet carrier of the first train and to the output member of the change-speed unit, a sun gear of the first train being secured to the input member of the change-speed unit and a sun gear of the second gear train forming the said one reaction member.

9. A transmission according to claim 1, wherein the change-speed unit has three gear trains, a ring gear of the first train being secured to a planet carrier of the second train and to a ring gear of the third train, a planet carrier of the third train being secured to a ring gear of the second train, a sun gear of the third train forming the said one reaction member, sun gears of the first and second trains being secured to the input member of the change-speed unit, and a planet carrier of the first train being secured to the output member of the change-speed unit.

10. A transmission according to claim 1, wherein the first driving connection is established when the supplementary two-speed unit is in its unitary ratio so that the input member of the supplementary two-speed unit is directly connected to the input member of the change-speed geared unit, and said connecting means also selectively establishing a third driving connection to the input member of the change-speed gear unit from the output member of the supplementary two-speed unit operating in its indirect ratio.

11. A transmission according to claim 10, wherein said first driving connection includes first releasable clutch means connected between said one reaction member and the output of said two-speed unit, wherein said driving connection includes second releasable clutch means connected between the input member of said two-speed unit and the input member of said change-speed unit, and the third driving connection including third releasable clutch means connected between the output member of said two-speed unit and the input member of said change-speed unit.

12. A transmission according to claim 10, wherein the change-speed unit includes first and second planetary gear trains having portions thereof coupled together, each of said gear trains including sun gear means, planetary gear means and ring gear means, one of the gear means associated with one of said gear trains comprising said one reaction member and being connected to said first driving connection, and the input member of said change-speed unit being connected to another of said gear means associated with one of the gear trains, said another gear means being different from said one gear means.

13. A transmission according to claim 12, including first, second and third releasable clutch means associated with said first, second and third driving connections, respectively.

14. A transmission according to claim 12, wherein said one gear means and said another gear means are both part of the same gear train, and wherein the output member of said change-speed unit is secured to one of the gear means associated with the other gear train.

15. A transmission according to claim 12, wherein said one gear means is part of the first gear train, wherein said another gear means in part of the second gear train, and wherein the output member for the change-speed unit is secured to a further one of the gear means associated with the second gear train.

* * * * *

UNITED STATES PATENT AND TRADEMARK OFFICE
CERTIFICATE OF CORRECTION

PATENT NO. : 3 941 013
DATED : March 2, 1976
INVENTOR(S) : Albert Arthur Miller

It is certified that error appears in the above-identified patent and that said Letters Patent are hereby corrected as shown below:

Column 7, line 67; change "changespeed" to ---change-speed---.

Column 8, line 2; change "through the" to ---through a---.

Column 8, line 3; change "of a" to ---of the---.

Column 8, line 52; change "said driving" to ---said second driving---.

Signed and Sealed this fifteenth Day of June 1976

[SEAL]

Attest:

RUTH C. MASON
*Attesting Officer*

C. MARSHALL DANN
*Commissioner of Patents and Trademarks*